United States Patent
Rodov

(10) Patent No.: US 9,076,174 B2
(45) Date of Patent: Jul. 7, 2015

(54) METHOD AND SERVICE FOR PROVIDING ACCESS TO PREMIUM CONTENT AND DISPERSING PAYMENT THEREFORE

(71) Applicant: Zepfrog Corp., Cambridge, MA (US)

(72) Inventor: Michael Rodov, Brooklyn, NY (US)

(73) Assignee: Zepfrog Corp., Cambridge, MA (US)

( * ) Notice: Subject to any disclaimer, the term of this patent is extended or adjusted under 35 U.S.C. 154(b) by 0 days.

(21) Appl. No.: 13/947,665

(22) Filed: Jul. 22, 2013

(65) Prior Publication Data

US 2013/0304610 A1 Nov. 14, 2013

Related U.S. Application Data

(63) Continuation of application No. 11/710,811, filed on Feb. 26, 2007, now Pat. No. 8,521,650.

(51) Int. Cl.
| | |
|---|---|
| *G06Q 30/00* | (2012.01) |
| *G06Q 30/06* | (2012.01) |
| *G06Q 30/02* | (2012.01) |
| *G06Q 30/04* | (2012.01) |
| *H04N 7/173* | (2011.01) |
| *H04N 21/2547* | (2011.01) |
| *H04N 21/472* | (2011.01) |
| *H04N 21/478* | (2011.01) |
| *H04N 21/81* | (2011.01) |
| *G06Q 20/14* | (2012.01) |
| *G06Q 20/22* | (2012.01) |

(52) U.S. Cl.
CPC ............ *G06Q 30/0601* (2013.01); *G06Q 30/02* (2013.01); *G06Q 30/04* (2013.01); *H04N 7/173* (2013.01); *H04N 21/2547* (2013.01); *H04N 21/47202* (2013.01); *H04N 21/4781* (2013.01); *H04N 21/8113* (2013.01); *G06Q 20/145* (2013.01); *G06Q 20/29* (2013.01)

(58) Field of Classification Search
None
See application file for complete search history.

(56) References Cited

U.S. PATENT DOCUMENTS

| | | |
|---|---|---|
| 5,666,416 A | 9/1997 | Micali |
| 5,717,757 A | 2/1998 | Micali |

(Continued)

FOREIGN PATENT DOCUMENTS

| | | | |
|---|---|---|---|
| CA | 2337596 A1 | 8/2001 | |
| CA | 2440682 A1 | 9/2002 | |

(Continued)

OTHER PUBLICATIONS

Doug Lowe, Internet Explorer 6 for Dummies, all pages, Sep. 2001.*

(Continued)

*Primary Examiner* — Calvin Cheung
(74) *Attorney, Agent, or Firm* — Brown Rudnick LLP; Mark S. Leonardo

(57) ABSTRACT

A method and system for providing premium content and dispersing payment therefore. The method includes entering into an agreement with at least one partner that provides premium content and entering into an agreement with at least one customer that grants the customer access to premium content provided by at least one partner. The method further includes collecting defined parameter data of at least one customer accessing the premium content and dispersing payment to at least one partner where the payment is determined from the defined parameter data. The defined parameter data can be approximate time spent.

20 Claims, 12 Drawing Sheets

(56) References Cited

U.S. PATENT DOCUMENTS

| | | |
|---|---|---|
| 5,793,868 A | 8/1998 | Micali |
| 5,812,668 A | 9/1998 | Weber |
| 5,812,688 A | 9/1998 | Gibson |
| 5,815,657 A | 9/1998 | Williams et al. |
| 5,828,840 A | 10/1998 | Cowan et al. |
| 5,850,446 A | 12/1998 | Berger et al. |
| 5,857,023 A | 1/1999 | Demers et al. |
| 5,889,863 A | 3/1999 | Weber |
| 5,903,777 A | 5/1999 | Brief |
| 5,933,830 A | 8/1999 | Williams |
| 5,943,424 A | 8/1999 | Berger et al. |
| 5,952,638 A | 9/1999 | Demers et al. |
| 5,960,083 A | 9/1999 | Micali |
| 5,963,924 A | 10/1999 | Williams et al. |
| 5,983,208 A | 11/1999 | Haller et al. |
| 5,987,132 A | 11/1999 | Rowney |
| 5,987,140 A | 11/1999 | Rowney et al. |
| 5,999,919 A | 12/1999 | Jarecki et al. |
| 6,002,767 A | 12/1999 | Kramer |
| 6,016,484 A | 1/2000 | Williams et al. |
| 6,021,399 A | 2/2000 | Demers et al. |
| 6,026,379 A | 2/2000 | Haller et al. |
| 6,029,150 A | 2/2000 | Kravitz |
| 6,055,508 A | 4/2000 | Naor et al. |
| 6,061,665 A | 5/2000 | Bahreman |
| 6,072,870 A | 6/2000 | Nguyen et al. |
| 6,097,811 A | 8/2000 | Micali |
| 6,119,105 A | 9/2000 | Williams |
| 6,157,917 A | 12/2000 | Barber |
| 6,157,920 A | 12/2000 | Jakobsson et al. |
| 6,178,409 B1 | 1/2001 | Weber et al. |
| 6,236,981 B1 | 5/2001 | Hill |
| 6,253,027 B1 | 6/2001 | Weber et al. |
| 6,289,318 B1 | 9/2001 | Barber |
| 6,301,659 B1 | 10/2001 | Micali |
| 6,304,915 B1 | 10/2001 | Nguyen et al. |
| 6,341,273 B1 | 1/2002 | Briscoe |
| 6,343,738 B1 | 2/2002 | Ogilvie |
| 6,373,950 B1 | 4/2002 | Rowney |
| 6,473,740 B2 | 10/2002 | Cockrill et al. |
| 6,473,794 B1 | 10/2002 | Guheen et al. |
| 6,609,113 B1 | 8/2003 | O'Leary et al. |
| 6,618,705 B1 | 9/2003 | Wang et al. |
| 6,681,017 B1 | 1/2004 | Matias et al. |
| 6,704,714 B1 | 3/2004 | O'Leary et al. |
| 6,742,125 B1 | 5/2004 | Gabber et al. |
| 6,760,731 B2 | 7/2004 | Huff |
| 6,945,457 B1 | 9/2005 | Barcelou |
| 7,013,296 B1 | 3/2006 | Yemini et al. |
| 7,020,638 B1 | 3/2006 | Yacobi et al. |
| 7,076,445 B1 | 7/2006 | Cartwright |
| 7,080,041 B2 | 7/2006 | Nagel |
| 7,099,850 B1 | 8/2006 | Mann, II et al. |
| 7,103,576 B2 | 9/2006 | Mann, III et al. |
| 7,110,079 B2 | 9/2006 | Lee |
| 7,127,236 B2 | 10/2006 | Khan et al. |
| 7,140,039 B1 | 11/2006 | Yemeni et al. |
| 7,146,344 B2 | 12/2006 | Wankmueller |
| 7,209,892 B1 | 4/2007 | Galuten et al. |
| 7,324,972 B1 | 1/2008 | Oliver et al. |
| 7,360,210 B1* | 4/2008 | Vacanti et al. ............... 717/171 |
| 7,376,722 B1 | 5/2008 | Sim et al. |
| 7,620,574 B2 | 11/2009 | Buehl et al. |
| 7,627,892 B2* | 12/2009 | Lin et al. .......................... 726/2 |
| 8,024,808 B1 | 9/2011 | Gleichauf |
| 8,521,650 B2 | 8/2013 | Rodov |
| 2001/0037311 A1 | 11/2001 | McCoy et al. |
| 2002/0032687 A1 | 3/2002 | Huff |
| 2002/0073075 A1 | 6/2002 | Dutta et al. |
| 2002/0099662 A1 | 7/2002 | Joshi |
| 2002/0111907 A1 | 8/2002 | Ling |
| 2002/0138764 A1 | 9/2002 | Jacobs et al. |
| 2002/0156696 A1 | 10/2002 | Teicher |
| 2003/0004880 A1 | 1/2003 | Banerjee et al. |
| 2003/0028429 A1 | 2/2003 | Mittman et al. |
| 2003/0028451 A1* | 2/2003 | Ananian ........................ 705/27 |
| 2003/0033257 A1 | 2/2003 | Wankmueller |
| 2003/0126079 A1 | 7/2003 | Roberson et al. |
| 2003/0172374 A1* | 9/2003 | Vinson et al. .................... 725/9 |
| 2004/0003283 A1 | 1/2004 | Goodman et al. |
| 2004/0029569 A1 | 2/2004 | Khan et al. |
| 2004/0030615 A1 | 2/2004 | Ling |
| 2004/0034597 A1 | 2/2004 | Durand |
| 2004/0044779 A1 | 3/2004 | Lambert |
| 2004/0054596 A1 | 3/2004 | Meinhardt |
| 2004/0139002 A1 | 7/2004 | Henn et al. |
| 2004/0199475 A1 | 10/2004 | Rivest et al. |
| 2004/0215561 A1 | 10/2004 | Rossides |
| 2005/0021731 A1* | 1/2005 | Sehm et al. ................... 709/224 |
| 2005/0049886 A1 | 3/2005 | Grannan et al. |
| 2005/0075939 A1 | 4/2005 | Bao et al. |
| 2005/0102242 A1 | 5/2005 | Omidyar |
| 2005/0130636 A1* | 6/2005 | Dennisson et al. .......... 455/414.2 |
| 2005/0131992 A1* | 6/2005 | Goldstein et al. ............. 709/202 |
| 2005/0144083 A1 | 6/2005 | Christ |
| 2005/0171903 A1 | 8/2005 | Yacobi et al. |
| 2005/0171904 A1 | 8/2005 | Yacobi et al. |
| 2005/0182735 A1 | 8/2005 | Zager et al. |
| 2005/0192871 A1 | 9/2005 | Galuten et al. |
| 2005/0216424 A1 | 9/2005 | Gandre et al. |
| 2006/0053293 A1 | 3/2006 | Zager et al. |
| 2006/0075027 A1 | 4/2006 | Zager et al. |
| 2006/0075028 A1 | 4/2006 | Zager et al. |
| 2006/0123340 A1 | 6/2006 | Bailey et al. |
| 2006/0161952 A1 | 7/2006 | Herz et al. |
| 2007/0022032 A1 | 1/2007 | Anderson et al. |
| 2007/0053513 A1* | 3/2007 | Hoffberg ........................ 380/201 |
| 2007/0073837 A1 | 3/2007 | Johnson-McCormick et al. |
| 2008/0115197 A1 | 5/2008 | Moss |
| 2008/0201225 A1 | 8/2008 | Maharajh et al. |
| 2008/0215468 A1 | 9/2008 | Monsa-Chermon et al. |
| 2008/0288411 A1* | 11/2008 | Copley ............................ 705/52 |
| 2008/0301189 A1 | 12/2008 | Petit et al. |
| 2011/0225417 A1 | 9/2011 | Maharajh et al. |

FOREIGN PATENT DOCUMENTS

| | | |
|---|---|---|
| CA | 2445573 A1 | 11/2002 |
| CA | 2514283 A1 | 8/2004 |
| CA | 2543730 A1 | 5/2005 |
| CN | 1581183 A | 2/2005 |
| EP | 1352337 A1 | 10/2003 |
| EP | 1376427 A2 | 1/2004 |
| FR | 2799078 A1 | 3/2001 |
| GB | 303406 A | 1/1929 |
| GB | 506122 A | 5/1939 |
| GB | 510333 A | 7/1939 |
| GB | 610002 A | 10/1948 |
| JP | 2306752 | 12/1990 |
| KR | 1081122 | 5/1966 |
| WO | 99/10843 A2 | 3/1999 |
| WO | 01/43094 A2 | 6/2001 |
| WO | 01/82242 A2 | 11/2001 |
| WO | 02/05152 A1 | 1/2002 |
| WO | 02/05226 A1 | 1/2002 |
| WO | 02/14973 A2 | 2/2002 |
| WO | 02/50743 A1 | 6/2002 |
| WO | 02/057950 A1 | 7/2002 |
| WO | 02/075499 A2 | 9/2002 |
| WO | 02/086830 A1 | 10/2002 |
| WO | 02/088874 A2 | 11/2002 |
| WO | 02/097750 A1 | 12/2002 |
| WO | 03/034310 A1 | 4/2003 |
| WO | 03/050648 A2 | 6/2003 |
| WO | 03/058391 A2 | 7/2003 |
| WO | 2004/015527 A2 | 2/2004 |
| WO | 2004/021115 A2 | 3/2004 |
| WO | 2004/068293 A2 | 8/2004 |
| WO | 2005/031618 A2 | 4/2005 |
| WO | 2005/048152 A1 | 5/2005 |
| WO | 2005/081765 A2 | 9/2005 |
| WO | 2005/088568 A1 | 9/2005 |
| WO | 2005/094442 A2 | 10/2005 |
| WO | 2006/004277 A1 | 1/2006 |

(56) References Cited

FOREIGN PATENT DOCUMENTS

| WO | 2006/029222 | A2 | 3/2006 |
| WO | 2006/050646 | A1 | 5/2006 |
| WO | 2006/088703 | A2 | 8/2006 |

OTHER PUBLICATIONS

Shirky, Dec. 19, 2000, The Case Against Micropayments, O'Reilly OpenP2P, 6 pages.

"Web Beacon," dated Feb. 23, 2006, retreived via Wayback Machine. All pages. http://en.wikipedia.org/wiki/web_beacon.

"Statistics," dated Sep. 1, 2005, retreived via Wayback Machine. All pages. http://en.wikipedia.org/wiki/statistical_analysis.

Zimbalist, 2005, Online Paid Content: U.S. Market Spending Report, Online Publishers Association, New York, NY, 19 pages.

Final Office Action mailed Sep. 14, 2010 for Related U.S. Appl. No. 11/710,811, 13 pages.

Non-Final Office Action mailed Jan. 10, 2013 for Related U.S. Appl. No. 11/710,811, 12 pages.

Non-Final Office Action mailed Feb. 1, 2010 for Related U.S. Appl. No. 11/710,811, 14 pages.

* cited by examiner

Pay $40 Monthly

For UNLIMITED Access To:

Partner A's Books
Partner B's Men's Articles
Partner C's Dating Services System
Partner D's Music
Partner E's Music
Partner F's Satellite Radio Content
Partner G's Business News Videos
Partner H's US News Articles
Partner I's Economic News Center
Partner J's Arcade Games
Partner K's Kids Games
Partner L's Virtual Games
Partner M's Virtual Game
Partner N's Movies
Partner O's Investment Software
Partner P's Encyclopeida
Partner Q's Research Services
Partner R's Greeting Card Delivery System Plus Premium Content From
800 Other Partners On ANY Device

Figure 3

Pay $40

For 20 Hours Of UNLIMITED Access To:

Partner A's Books
Partner B's Men's Articles
Partner C's Dating Services System
Partner D's Music
Partner E's Music
Partner F's Satellite Radio Content
Partner G's Business News Videos
Partner H's US News Articles
Partner I's Economic News Center
Partner J's Arcade Games
Partner K's Kids Games
Partner L's Virtual Games
Partner M's Virtual Game
Partner N's Movies
Partner O's Investment Software
Partner P's Encyclopeida
Partner Q's Research Services
Partner R's Greeting Card Delivery System Plus Premium Content From
800 Other Partners On ANY Device

Figure 4

Pay $40 Monthly

For Access To:

2 Books From Partner A
10 Men's Articles From Partner B
30 Minutes Of Dating From Partner C
15 Songs From Partner D
2 Hours of Music From Partner E
2 Satellite Radio Shows From Partner F
10 Business News Videos From Partner G
24 US News Articles From Partner H
1 Hour Of Economic News From Partner I
5 Arcade Games From Partner J
30 Minutes Of Playtime From Partner K
5 Virtual Games From Partner L
3 Movies From Partner M
6 Custom Investment Tips From Partner N
50 Encyclopedia Articles From Partner P
Partner Q's Research Services
10 Custom Greeting Cards From Partner R Plus Limited Premium Content From
50 Other Partners On Compatible Computers And
Mobile Media Players

Figure 5

Pay $40 Monthly

For 20 Hours Of Access To:

2 Books From Partner A
10 Men's Articles From Partner B
30 Minutes Of Dating From Partner C
15 Songs From Partner D
2 Hours of Music From Partner E
2 Satellite Radio Shows From Partner F
10 Business News Videos From Partner G
24 US News Articles From Partner H
1 Hour Of Economic News From Partner I
5 Arcade Games From Partner J
30 Minutes Of Playtime From Partner K
5 Virtual Games From Partner L
3 Movies From Partner M
6 Custom Investment Tips From Partner N
50 Encyclopedia Articles From Partner P
Partner Q's Research Services
10 Custom Greeting Cards From Partner R Plus Limited Premium Content From
800 Other Partners On Compatible Computers And
Televisions

Figure 6

METHOD AND SERVICE FOR PROVIDING ACCESS TO PREMIUM CONTENT AND DISPERSING PAYMENT THEREFORE

RELATED APPLICATION

The present application is a continuation of U.S. patent application Ser. No. 11/710,811, filed Feb. 26, 2007, now U.S. Pat. No. 8,521,650, the content of which is incorporated by reference herein in its entirety.

FIELD OF INVENTION

The present disclosure generally relates to methods and services for providing premium content and, more particularly, to a method and service for providing access to premium content and dispersing payment for premium content.

BACKGROUND

Premium content is any digital or otherwise intangible product sold to consumers. Examples of premium content may include, but are not limited to articles, eBooks, sound files, music, interactive applications, software, games, video files, movies or other digital products. Other examples of premium content may include, but are not limited to, live comedy shows, movie screenings, entertainment, educational lectures, art shows, animal shows, museum displays and other intangible products. The majority of premium content is available over the internet. Furthermore, many digital or otherwise intangible products which are not available for sale automatically qualify as premium content when the products are made available for sale.

Generally, the term "content" refers to any digital or otherwise intangible product. The more specific term "free content" refers to any digital or otherwise intangible product distributed at no-cost. Comparatively, premium content is a type of "content" for which publishers require compensation. Therefore, publishers require consumers to pay for premium content. This difference explains why premium content, generally, is of a higher quality than free content.

Despite the theoretical efficiencies offered by the internet, current payment methodologies for the sale of premium content are inferior to current payment methodologies for the sale of tangible products. This contrast is the result of an economic property which does not generally apply to tangible products, but does generally apply to premium content.

This property is a practically non-existent variable cost, i.e., no significant cost to transfer premium content from source to consumer. For example, the required variable costs for distributing premium content from a web server to an internet user's personal computer are virtually zero. In contrast, the variable costs for distributing physical products from a manufacturer's warehouse to a consumer's home are relatively high.

The lack of variable costs for publishers represents an opportunity for consumers to use a variety of premium content flexibly within the context of their individual lifestyles. Particularly, the lack of variable costs for publishers may enable a consumer to freely watch movies, listen to music, view pictures, play games, interact with software or engage in other activities made possible by the interne for as long as the consumer likes, on the devices the consumer prefers, and at times which are most convenient to the consumer.

Unfortunately, consumers are unable to take full advantage of hardware devices, technological developments and economic features of premium content because the currently available systems for purchasing premium content are overly burdensome. Due to the lack of an efficient payment system, publishers have little incentive to make premium content available to consumers.

One explanation for the lack of publisher incentive to make premium content available is the prevalence of credit card processing rates which are costly to premium content publishers. The average cost for processing a credit card payment is approximately 2.2% plus 25 cents. Therefore, if a premium content publisher sells an article for thirty cents, the publisher only receives 4 cents.

Several attempts have been made to resolve this credit card processing issue. These attempts include the development of payment methodologies such as the micropayments methodology, the high-price methodology, and the subscription methodology.

The micropayments methodology has been embraced because it attempts to value individual pieces of premium content at fair market values. As an overview, micropayments are small transactions often for cents or fractions of cents, which are paid for individual premium content items. Some examples of micropayment transactions for premium content include purchasing a concise 5-minute movie clip detailing the Peloponnesian War for 18 cents, sending an electronic birthday card for 9 cents, playing a multiplayer game for 31 cents, reading six stock recommendations from top-investors for 26 cents and listening to one hour of satellite radio for 45 cents.

Most emerging micropayment companies have offered a service called aggregated payment processing. Aggregated payment processing involves aggregating the micropayments for multiple publishers into a larger credit card charge on a per-customer basis. For example, if the previously mentioned premium content items are purchased through a micropayments provider implementing aggregated payment processing, the micropayments provider places one charge of $1.29 on the consumer's credit card instead of placing five individual charges.

Despite the theoretical efficiencies of micropayments, the payment methodology is inconvenient for consumers. Before the consumer reads any article, views any image, hears any sound file or watches any video, the consumer must make the decision to buy or not to buy the premium content. Therefore, one problem with the micropayments methodology is that it requires the consumer to formulate many decisions on a minute-by-minute basis, resulting in consumer inconvenience. Consumer inconvenience includes the consumer's cost of time and anxiety associated with evaluating premium content, forming a buying decision and completing a purchase.

Some micropayments companies have developed systems which attempt to respond to the issue of consumer inconvenience by not requiring customers to actively formulate consumer decisions. Instead, the companies either charge customers a flat rate for each piece of premium content or charge customers prices which are preset by publishers. Following this method, customers are charged for each piece of premium content that customers access but are not asked to actively approve each sale. This payment methodology creates what has been termed "a double-standard of value" as discussed by Clay Shirky in his 2000 essay, "The Case Against Micropayments." A double standard of value occurs when publishers collect payment for premium content but imply that the cost of the premium content is too slight for customers to contemplate purchasing the premium content. This procedure further confuses customers and only increases consumer inconvenience.

Since the micropayment methodology is not practically feasible, a surprisingly high number of publishers have decided to charge for premium content on a per-item basis by adopting the high-price methodology. The high-price methodology is a solution where premium content publishers charge exceptionally high prices. The theory for the high-price methodology is that increased prices will make-up for reduced consumption. For instance, a publisher may face a situation where the publisher spends $100,000 in fixed costs on producing and marketing an eBook. This publisher would break-even, disregarding credit card processing fees, by charging ten cents to each of its one-million estimated customers. Instead of charging ten cents per eBook, the publisher charges ten dollars per eBook. By charging ten dollars, the publisher will break-even, disregarding credit card processing fees, by selling to only ten thousand customers.

The high-price methodology typically fails for multiple reasons. One reason is that the customer demand curve for premium content, i.e., the relationship between the price of premium content and how many customers will buy premium content for that price, is a non-linear function. For example, if a price of ten cents attracts one million customers, a price of ten dollars is unlikely to attract ten thousand customers. Moreover, demand for most premium content tends to be very price elastic.

Another reason why the high-price methodology fails is the increase in purchase risk for customers. Purchase risk is the risk that a customer's purchase will not meet expectations. This purchase risk involves the potential to lose time or money. For instance, when a customer purchases a disappointing eBook, the customer generally may not return it, as the eBook is a digital product. Therefore, the customer is forced to either read an eBook which does not meet expectations and lose time or not read the eBook despite paying for it and lose money.

The majority of publishers have rejected the micropayments and high-price payment methodologies as inferior revenue models. Instead, the publishers sell premium content via the subscription payment methodology. The sale of a subscription generally involves receiving a fixed-fee payment from a customer in exchange for unlimited access to a single type of premium content over a fixed period of time. For example, a music subscription may include unlimited access to two million songs. Here, for $20 per month, a customer may listen to as many of the two million songs as the customer would like, for as long as the customer would like during the month.

This music subscription is a good deal for a heavy user of the service. However, this music subscription is expensive for a casual music listener. For example, if a customer spends two hours per day listening to music, that person is paying roughly 33 cents per hour for music according to this example. On the other hand, if a customer spends two hours per month listening to music, that customer is paying $10 per hour for music. All else being equal, the music subscription is a much better value for the former customer. More generally, all subscriptions work in a similar manner. The subscriptions are good deals for frequent customers and poor deals for infrequent customers.

Furthermore, the wide variety of subscriptions available on the internet creates additional problems for customers who may be interested in premium content from more than one subscription. For example, an average customer may desire to access premium content from an eBook subscription, an audio book subscription, a nutrition and fitness article subscription, three news article and video subscriptions, two music subscriptions, a satellite radio subscription, three arcade game subscriptions, two media-driven game subscriptions, three movie subscriptions, an investment advice subscription, two research service subscriptions and three dating services system subscription packages over a period of time. In this example, an average customer must pay for 23 different subscriptions as though the customer is a heavy user. Moreover, the customer must also complete 23 registrations and decide to purchase each of the subscriptions, resulting in significant consumer inconvenience.

These problems explain why approximately only 12% of internet users buy premium content on the internet, according to the Online Publishers Association's 2005 report. Moreover, these problems characterize a dysfunctional market, where many internet users are interested in premium content, but very few actually pay for it.

Some in the industry have argued that internet users simply do not want to pay for premium content. Instead, publishers are urged to adopt advertising subsidies while making high-quality content available as free content. However, advertising is only a viable option in limited circumstances. More precisely, only publishers who can connect contextual advertisers with highly targeted customers can cover their fixed costs.

The refusal of traditional publishers to make content available over the internet for free demonstrates the wide variety of high-quality content which could potentially be available to customers if a functional payment methodology, rather than a standalone advertising model, was known. Moreover, when consumers do not pay for premium content, publishers have less incentive to acquire, finance or develop more or better premium content.

Currently, the premium content industry suffers from a problem termed a double-coincidence of wants. A double coincidence of wants occurs where a market functions only when both parties, co-incidentally, want each other's products, in the acceptable quantities, at the same time, according to agreeable terms. Historically, the double coincidence of wants problem is only known to have appeared to this extent in barter economies.

When the double coincidence of wants problem appeared in barter economies, money was invented to help solve this problem. The invention of money as a medium of exchange sparked increased trade, allowed for specialization, lead to capitalism and industrialization and lead finally to today's consumer economy. The invention of money also lends insight into the current crisis facing the premium content industry, which is a double-coincidence of wants problem. Publishers want money and consumers want to obtain the most satisfaction from their time. Using money as a medium of exchange is overly time-consuming, thus, self-defeating to consumers. Therefore, the seemingly most-efficient micropayments methodology is a dysfunctional paradox. Also, many alternatives, whether the alternatives fit under the high-price or subscription payment methodologies, allow for sales of premium content but only to consumers who are not price-conscious or who are heavy users of individual pieces or types of premium content coincidentally.

Most internet users are dissatisfied with the current methodologies available for purchasing premium content. The result is substantially less economic activity. Moreover, some internet users steal premium content. This issue would occur less frequently if a payment solution for premium content existed that would function much like money functions for tangible products, but solves the double coincidence of wants problem facing the premium content industry.

Therefore, a need exists for another or alternative medium of exchange in addition to money. Additionally, a need exists for a premium content access and payment method that eliminates the need for numerous consumer decisions by minimizing transaction costs such as consumer inconvenience. Furthermore, a need exists for a method that increases total compensation publishers receive for premium content. Desirably, the variety of premium content includes an extensive selection of high-quality articles, images, music, video and interactive applications serving a wide variety of purposes and interests that are provided by a wide variety of publishers.

SUMMARY

Accordingly, a method and system for providing premium content and dispersing payment therefore is provided. The method includes entering into an agreement with at least one partner that provides premium content and entering into an agreement with at least one customer that grants the customer access to premium content provided by at least one partner. The method further includes collecting defined parameter data of at least one customer accessing the premium content and dispersing payment to the partner where the payment is determined by the defined parameter data.

In one embodiment, the premium content is provided through the internet. In another embodiment, the agreement with at least one partner provides that the payment being dispersed is determined by using previously collected defined parameter data.

Further, in another embodiment, the defined parameter comprises approximate time spent. Payment may be dispersed and be determined from approximate time spent by each of the customers. In an alternative embodiment, payment may be dispersed and be determined from approximate time spent by all customers.

In yet another embodiment, the step of collecting approximate time spent data includes using web beacons. Alternatively, or in combination with web beacons, various other methods of collecting approximate time spent data may be employed. These methods include using automatic counting software, statistical sampling and presentation code.

In yet another embodiment, the defined parameter data comprises unique visits. In another embodiment, the defined parameter data may comprise page views, survey data or variables determined from a customer rating mechanism.

Furthermore, in another embodiment, the method includes the steps of forming a premium content bundle including premium content provided by a plurality of partners and entering into an agreement with at least one customer where at least one customer agrees to pay for access to the premium content bundle for a period of access. The method also includes obtaining approximate time spent data from at least one customer accessing the premium content from the premium content bundle and calculating a total payment owed to each partner, wherein the step of calculating includes using approximate time spent. The method also includes the step of dispersing payment to each of the plurality of partners.

The inventive service according to the present disclosure includes a plurality of premium content publishers that provide premium content and at least one customer subscriber to the premium content of the plurality of premium content publishers. The service also includes a fee paid by at least one customer subscriber and a payment to the at least one of the plurality of premium content publishers. The system further includes a calculation for the payment from at least a portion of the fee determined from collected parameter data. The collected parameter data may be approximate time spent.

The inventive system for providing search results according to the present disclosure includes the steps of receiving a search query from a customer and delivering search results where a search algorithm uses approximate time spent to deliver the search results.

BRIEF DESCRIPTION OF THE DRAWINGS

The objects and features of the present disclosure are set forth with particularity in the appended claims. The present disclosure, as to its organization and manner of operation, together with further objectives and advantages may be understood by reference to the following description, taken in connection with the accompanying drawings, in which:

FIG. 3 is an example advertisement in accordance with the present disclosure;

FIG. 4 is an example advertisement in accordance with the present disclosure;

FIG. 5 is an example advertisement in accordance with the present disclosure;

FIG. 6 is an example advertisement in accordance with the present disclosure;

DETAILED DESCRIPTION OF EXEMPLARY EMBODIMENTS

Figure 1:
FIG. 1 is a flow chart depicting the relationships involved in a method for providing access to and dispersing payment for premium content according to an exemplary embodiment of the present disclosure.

The exemplary embodiments of the methods and systems disclosed are discussed in terms of access to content, and more particularly, in terms of access to premium content and approximate time spent. It is envisioned, however, that the present invention will find application to a wide variety of methods and services involving access to premium content.

Premium content is any digital or otherwise intangible product sold to consumers. Examples of premium content may include, but are not limited to articles, eBooks, sound files, music, interactive applications, software, games, video files, movies or other digital products. Other examples of premium content may include, but are not limited to live comedy shows, movie screenings, entertainment, educational lectures, art shows, animal shows, museum displays and other intangible products. The majority of premium content is available over the interne. It is contemplated that many new formats for premium content will be available and like the previous list, these new formats will qualify as premium content when the content is made available for sale.

In the discussion which follows, the term publishers referred to herein means entities or individuals that publish premium content. Publishers may be any person, persons, entity or entities. These entities may be large or small entities. The term partner means any publisher who participates in the method according to the present disclosure. A partner may be any variety of publisher selling any variety of premium content.

The term approximate time spent refers to a metric by which to measure use of premium content based on time of consumer or customer use as will be discussed below in more detail. A consumer becomes a customer when the customer enters into an agreement with a digital rights broker in accordance with the present disclosure. A customer may be any individual or entity which accesses premium content. Customer access includes any method in which premium content is used by a customer. Customer access includes viewing, reading, playing, interacting, listening or otherwise using premium content.

By way of background, premium content may be valued in a variety of ways. One possible valuation equation that may be used to value premium content is shown below.

$$V = \frac{u}{t^\alpha}$$

Where V is the value of any premium content item, u is the amount of utility, usefulness or joy, it brings to the customer, t is the amount of time is required to experience or use the premium content item and α is the customer's own constraint on time based upon the customer's own particular life circumstances, such as how busy the person is.

This equation may help publishers analyze consumer demand for products based upon more than simply how much utility the consumer receives from the product in accordance with the present disclosure. This equation incorporates time into the valuation of premium content and provides a foundation to the methods of providing access to premium content and dispersing payment to publishers based upon defined parameter data in accordance with the present invention. This valuation technique will be discussed below in more detail.

The following discussion includes a description of the method for providing access to premium content and dispersing payment for premium content where the payment is determined from approximate time spent. Reference will now be made in detail to the exemplary embodiments of the disclosure, which are illustrated in the accompanying figures.

Turning now to the figures wherein like components are designated by like reference numerals throughout the several views, FIG. 1 illustrates the general relationships between the parties involved in the method 10 for providing access to and dispersing payment for premium content in accordance with the present disclosure. In step 12, a publisher enters into an agreement with a digital rights broker. The agreement provides terms that dictate the rights and obligations of the digital rights broker and the publisher. By entering into this agreement, the publisher becomes a partner. At step 14, a customer desiring to have access to premium content enters into an agreement with the digital rights broker. The customer pays the digital rights broker for the rights to access premium content included in a premium content bundle. The digital rights broker provides access to premium content at step 16.

At step 18, the digital rights broker disperses payment to the partner. It is contemplated that a partner may be a digital rights broker.

Figure 2:
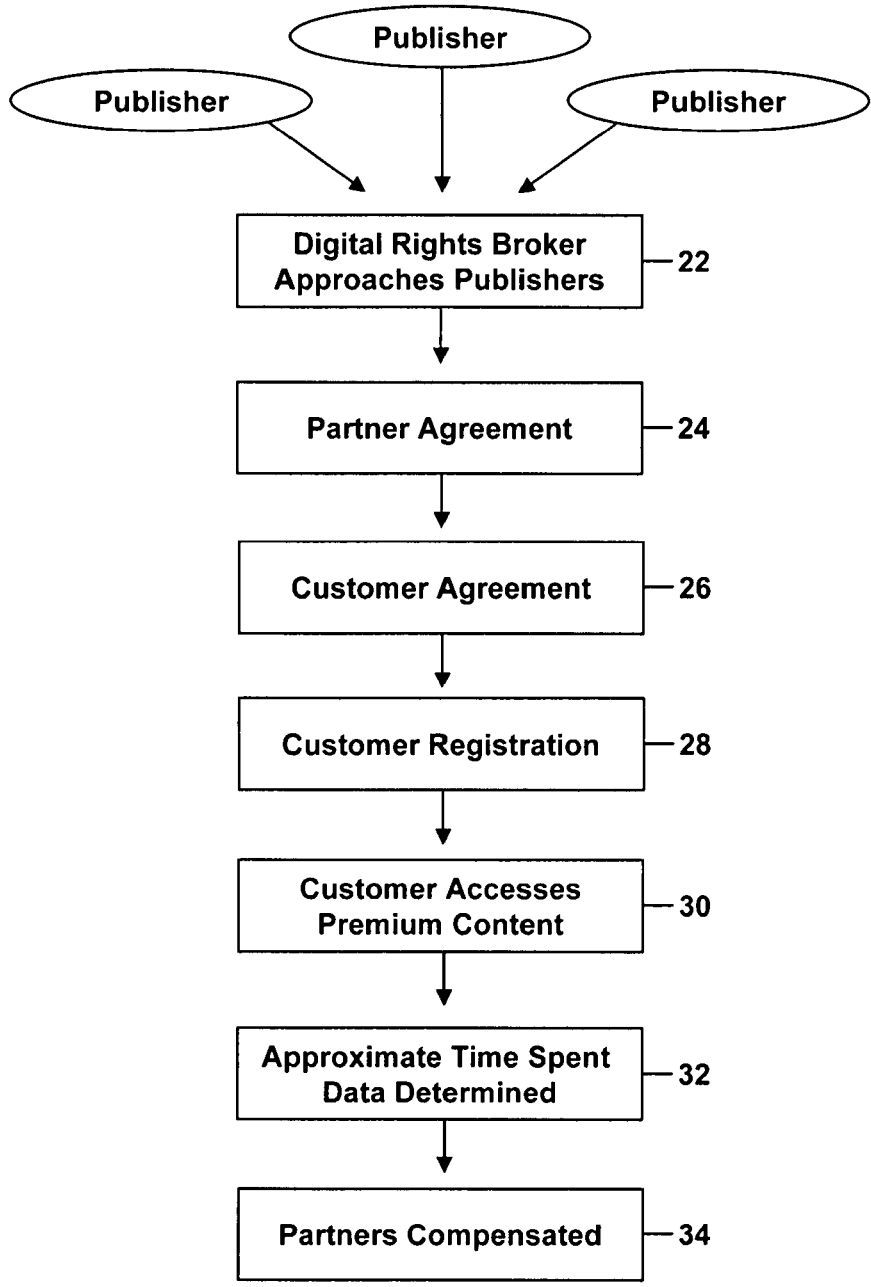
FIG. 2 is a flow chart illustrating a method for providing access to and dispersing payment for premium content according to an exemplary embodiment of the present disclosure.

Now referring to FIG. 2 in conjunction with the FIGS. 3-6, a method 20 for providing access and dispersing payment according to the present disclosure is illustrated. At step 22, the digital rights broker approaches at least one publisher to enter into an agreement that provides for the publisher and/or the publisher's premium content to be included in a premium content bundle. Bundling is a sales scheme where products are sold together for less than what the products would be sold for individually. According to the present disclosure, a wide variety of ways to bundle products is contemplated.

By way of background, the following equations and examples demonstrate bundling theory.

Mathematically, a publisher should choose to bundle when:

$$\pi_B > \sum_1^P \pi_P$$

Where:

$\pi_B$ is the net profit from selling the bundle; and $$\sum_1^P \pi_P$$

is the net profit from selling the products individually

Because net profit is equal to total revenues minus total costs, this equation may be expanded to:

$$R_B - C_B > \sum_1^P (R_P - C_P),$$

where $R_B - C_B$ is the total revenue minus the total costs from the sale of the bundle, and $$\sum_1^P (R_P - C_P)$$

is the total revenues minus the total costs from the sale of the products individually.

When non-tangible products are sold, the marginal cost of including additional products in a bundle or of transmitting any individual piece of premium content is generally insignificant. Therefore, for premium content, the bundling equation may be simplified to the following equation:

$$R_B > \sum_1^P R_P$$

where $R_B$ is the total revenue from the sale of the bundle and $$\sum_{1}^{p} R_p$$

is the total revenue from the sale of the products individually.

This simplification allows bundling decisions to be based solely upon demand, i.e., how much customers value each product.

The data in Table 1 provides an example of a bundling decision by publishers.

TABLE 1

|  | Product 1 | Product 2 | Bundle |
|---|---|---|---|
| Customer 1 | $5 | $9 | $14 |
| Customer 2 | $11 | $5 | $16 |
| Price | $11 | $5 | $14 |
| Revenue | $11 | $10 | $28 |

This basic 2 by 2 model shows the maximum amount each customer is willing to pay for each product. For example, the first customer is willing to pay up to $5 for the first product, while the second customer is willing to pay up to $11 for the first product. When selling individually, the publisher prices product 1 at $11 in order to maximize revenue. By contrast, the publisher's profit-maximizing price for product 2 is $5, not $9, since the publisher may collect a total of $10 from both customers. Therefore, $$\sum_{1}^{p} R_p = \$11 + \$10 = \$21.$$

When the products are sold together as a bundle, customer 1 is willing to pay up to $14 for both products. Customer 2 is willing to pay up to $16 for both products. Therefore, the profit-maximizing price to charge for a bundle, including products 1 and 2, is $14. Thus, $R_B$ is equal to $28. The example presented in Table 1 demonstrates that bundling may increase both sales and revenues because the revenue from bundling is greater than the revenue from selling the products individually.

Research by economists and others in the field shows that, despite the fact that there are circumstances when $$R_B \le \sum_{1}^{p} R_p,$$

as the amount of publishers who include their products in the bundle, the amounts of products included in the bundle and/or the amount of customers who purchase the bundle increases, the chance that $$R_B > \sum_{1}^{p} R_p$$

increases exponentially. This occurs even when customer demand is unknown and other factors, such as a disproportionate ratio of customers to publishers, atypical demand curves for certain types of premium content, etc., are controlled. Moreover, research has shown that bundling increases total revenues to such an extent that the generally optimal solution for publishers and customers is to sell as much premium content in one premium content bundle as possible.

According to the present disclosure, digital rights brokers may select partners who match specified criteria desired by the digital rights broker. The partner's premium content, or the company itself, may be evaluated against a certain subjective standard of a good partner. A good partner may need to have high annual sales, products that are targeted to a definite niche segment of customers or have generally broad appeal, a certain number of premium content creators, e.g., writers on staff, or a certain amount of premium content already created or a small staff which the partner is willing to train according to material or instruction offered by the digital rights broker.

Another possible method of selecting partners may be an initial signup or maintenance fee that the digital rights broker charges the partner in order to include their premium content in the premium content bundle. This would narrow the partners interested to only those who have legal interest in premium content which is appealing to customers. Additionally, with this method, partners would have less of an incentive of committing fraud for risk of losing their fee and having their contractual agreement terminated if the fraud is uncovered. Competing partners will be described below in more detail.

The mechanism of charging a fee for inclusion suggests that many quality writers, artists, producers or computer programmers would be excluded from selling their premium content, however, this may not be the case. The entire function of publishing is to find the best premium content creators. The method according to the present disclosure provides partners incentive to acquire legal interest in premium content owned by smaller publishers. Furthermore, a partner may be a digital rights broker.

At step 24, at least one publisher enters into an agreement with the digital rights broker and becomes a partner. The digital rights broker will bundle a variety of premium content, to which the publishers approached have a legal ownership interest in, into a premium content bundle to offer to a customer. It may be important to increase the variety of premium content in the premium content bundle by inviting competitors to be partners. Also, it is contemplated that a premium content bundle may also include free content.

This contractual agreement between a partner and the digital rights broker enables the digital rights broker to sell customers the right to access a premium content bundle including some or all of the premium content each partner includes in the premium content bundle, as exemplified below.

At step 26, the digital rights broker enters into an agreement with a customer. A customer agrees to pay the digital rights broker a fee. In exchange for the customer's payment, the digital rights broker agrees to provide the customer the right to access premium content included in the premium content bundle. This customer agreement may include terms which explicitly or implicitly specify through which methods, to what extent, on which devices or for what period of access the premium content is available to a customer.

For example, the period of access is a customer agreement term which may or may not be specified. The period of access is either a fixed period, e.g., a day, week, month, year, which expires at a predetermined time; a variable period which expires based upon a customer's access of premium content, e.g., expires when a customer pays for 20 hours of access and finishes using all of it; or a mixed period, e.g., expires when either the fixed component or variable component is met. The period of access is an example of one of the possible terms of the agreement that dictate the rights and obligations of the customer and the digital rights broker in the agreement for providing customer access to premium content. This period of access will generally determine when the customer's rights to access premium content in the premium content bundle expire.

The customer agreement may also limit the customer's access rights by placing limits on the amount of access the customer has to certain premium content or premium content types in the premium content bundle, placing limits on the devices the customer may use to access the premium content, or by implementing digital rights management software in other capacities. When very few or none of these limitations exist, the customer has the right to unlimited access of premium content in the premium content bundle. When many limitations exist, the customer has the right to limited access of premium content in the premium content bundle.

As previously discussed, the customer agreement may include a variety of terms. For example, the customer agreement may be for a fixed period of access for unlimited access to premium content in a premium content bundle as depicted in FIG. 3. As shown in FIG. 3, the sample advertisement depicts a premium content bundle which sells for $40 per fixed period of access which expires after one month. This premium content bundle allows for unlimited access to premium content included in the premium content bundle in an unlimited quantity, without any specific limitations, on any device, for any amount of time.

In another example, the customer agreement may be for a variable period of access for unlimited access to premium content included in the premium content bundle as depicted in FIG. 4. As shown in FIG. 4, the sample advertisement depicts a premium content bundle which sells for $40 per variable period of access which expires after 20 hours of total customer access time.

Similarly, the customer agreement may be for a fixed period of access for limited access to premium content included in the premium content bundle as shown in FIG. 5. FIG. 5 depicts a premium content bundle which sells for $40 per fixed period of access which expires after one month. This premium content bundle allows for limited access to premium content included in the premium content bundle by placing restrictions on the amount of premium content which may be downloaded, the amount of time which may be spent accessing premium content from several of the partners, the amount of partners whose premium content may be included in the premium content bundle and the devices which may be used to access premium content included in the premium content bundle.

In another example, the customer agreement may be for a mixed period of access for limited access to premium content included in the premium content bundle as depicted in FIG. 6. This premium content bundle sells for $40 per mixed period of access which expires after either 20 hours of total customer access time or one month, whichever happens first.

At step 28, the digital rights broker registers the customer and collects the customer's payment. The customer is registered after the digital rights broker collects the customer's authentication information, e.g., a username and password, personal information, e.g., name and address; and payment information, e.g., a credit card number. Authentication information may also be provided by the graphical user interface rather than accepted as input from the customer.

A renewal mechanism may be implemented. A renewal mechanism will automatically charge the customer to renew the customer agreement at the conclusion of each period of access. This feature helps insure uninterrupted service for the customer. Automatic renewal may be automatically turned off when a customer cancels a subscription. The customer also may be offered the option to turn off the automatic renewal mechanism during the initial sign-up, which forces the customer to logon and pay again for each subsequent period of access to ensure continued service.

At step 30, access is provided to the customer and the customer has the ability to access the premium content bundle according to the terms of the customer agreement. The digital rights broker determines the approximate time spent at step 32. Approximate time spent is the amount of time each customer or all customers actively spend accessing each partner's premium content included in the premium content bundle. Approximate time spent is determined by tracking, monitoring, counting, analyzing, calculating, gathering or otherwise determining the amount of time customers spend accessing each partner's premium content in the premium content bundle. Approximate time spent typically does not express the exact amount of time customers spend accessing premium content since time is a continuous variable. However, approximate time spent may be closely determined in many cases. Approximate time spent will be discussed below in further detail. At step 34, the digital rights broker disperses payment to the partners based on approximate time spent.

Figure 7:
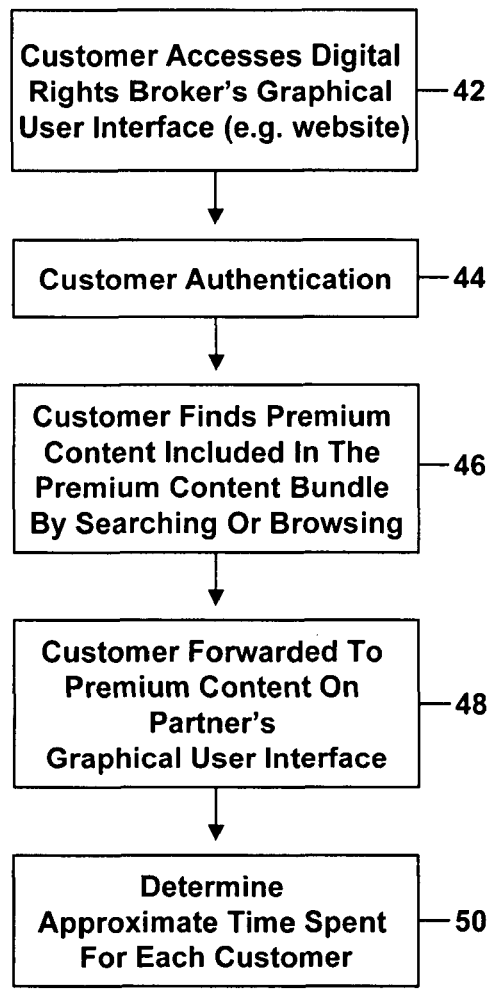
FIG. 7 is a flow chart depicting a method of providing access to premium content and tracking approximate time spent in accordance with the present disclosure.

By way of example, FIG. 7 illustrates the method 40 of providing customer access and determining approximate time spent in accordance with the present invention. Method 40 typically occurs after the digital rights broker enters into an agreement with a customer. The customer visits the digital rights broker's graphical user interface (GUI) at step 42. A graphical user interface is a software program which allows premium content to be accessed by customers. While it is contemplated that the graphical user interface may be a website, it is also envisioned that the graphical user interface may be a browser toolbar, standalone web browser, standalone software application or another type of software application. Additionally, the graphical user interface may be a software application being displayed on any device that can connect to the internet, such as a television, portable music player, portable media player, portable communications device, video game console or any type of computer. Moreover, the graphical user interface may be a text-based user interface.

The digital rights broker authenticates the customer at step 44. During authentication, the graphical user interface accepts authentication information, e.g., username/password or simply a pass code, either as input from the customer or from the customer's system. The customer's information is validated. Authentication may also occur through the partner's graphical user interface rather than through the digital rights broker's graphical user interface.

At step 46, the customer finds premium content included in the premium content bundle by searching or browsing. Searching involves receiving a search query and delivering search results. Search results may be generated by a search algorithm. A search algorithm is a calculation which delivers ranked search results in order of relevancy to an internet user. The search algorithm may deliver search results based upon determinations of approximate time spent. For example, a customer provides a search query and based upon that search query, search results are delivered by a search algorithm that incorporates the use of approximate time spent. The approximate time spent may be determined and used as discussed below. Browsing involves clicking through a hierarchy of links, usually organized by a category, or some other criteria. It is contemplated that the premium content may be found either through the digital rights broker's graphical user interface, or independently from the digital rights broker's graphical user interface.

Steps 42, 44 and 46 may occur in any order depending on how the customer chooses to arrive at premium content included in the premium content bundle and enters into an agreement for access to premium content included in a premium content bundle. FIG. 7 is an example of a possible method illustrating that the customer purchased a premium content bundle and is allowed access to the premium content bundle. It is contemplated that a customer may access premium content and the digital rights broker may track approximate time spent in a variety of ways, some of which will be discussed below.

At step 48, the digital rights broker forwards the customer to premium content available through the partner's graphical user interface. Step 48 involves the digital rights broker's web server sending the partner's web servers data which signals that this internet user is a customer who is entitled to access of premium content on its graphical user interface.

An alternative is for the digital rights broker to store the partner's premium content directly on the digital rights broker's graphical user interface, which would eliminate several steps in FIG. 7. For example, this would involve the digital rights broker placing a partner's videos directly on the digital rights broker's website for customers to watch rather than forwarding the customer to a partner's website.

In another embodiment, the digital rights broker and/or the partner can allow customers to access premium content on a device not connected to the internet, e.g., on a device that can disconnect from the internet such as a portable media player, etc. If the software running on the device is compatible, the approximate time spent data may be accepted from the device by web servers when the data is received after a reconnection with the internet. If the approximate time spent data arrives too late, i.e., after the period of access for the premium content bundle ends, accounts may still be reconciled, perhaps at a discount or premium. Compatible means that software on the device is able to reliably determine approximate time spent. Data is transmitted to the digital rights broker's web servers when the data can be sent over the internet. If the software running on the device is not compatible, approximate time spent data may be re-approximated using statistical methods based upon other customers' approximate time spent data as will be discussed below in more detail.

When customers access premium content, it may be desirable for the digital rights broker to make the customer's information available to the partners. For example, a partner may wish to greet a customer by name when the customer signs on to a particular page. Additionally, a partner may wish to use a zip code for delivering premium content based on a local location. A date of birth may help a partner determine if a customer is of age to access certain premium content. Also, a partner may wish to use an email address to send certain requested information. It would be very frustrating for the customer to enter personal information multiple times, so it may be useful for the digital rights broker to share this information with partners within bounds of a privacy policy made available to customers and/or privacy settings which are set by individual customers.

At step 50, the digital rights broker determines approximate time spent for customers accessing the premium content bundle. Generally, the accuracy of determining approximate time spent is based on the digital rights broker's technical limitations.

Figure 8:
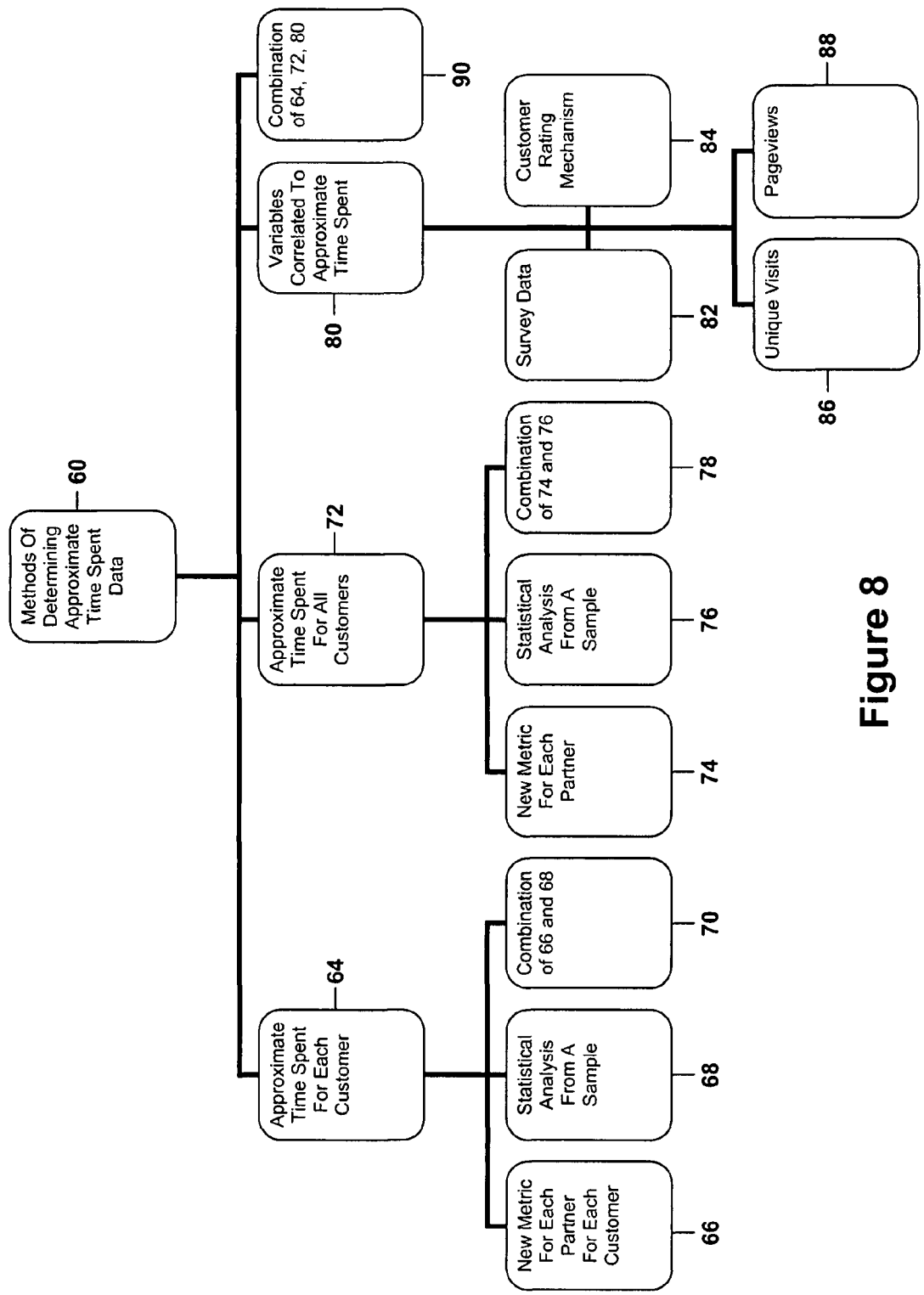
FIG. 8 is a block diagram illustrating some of the various ways of determining approximate time spent.
Figure 9:
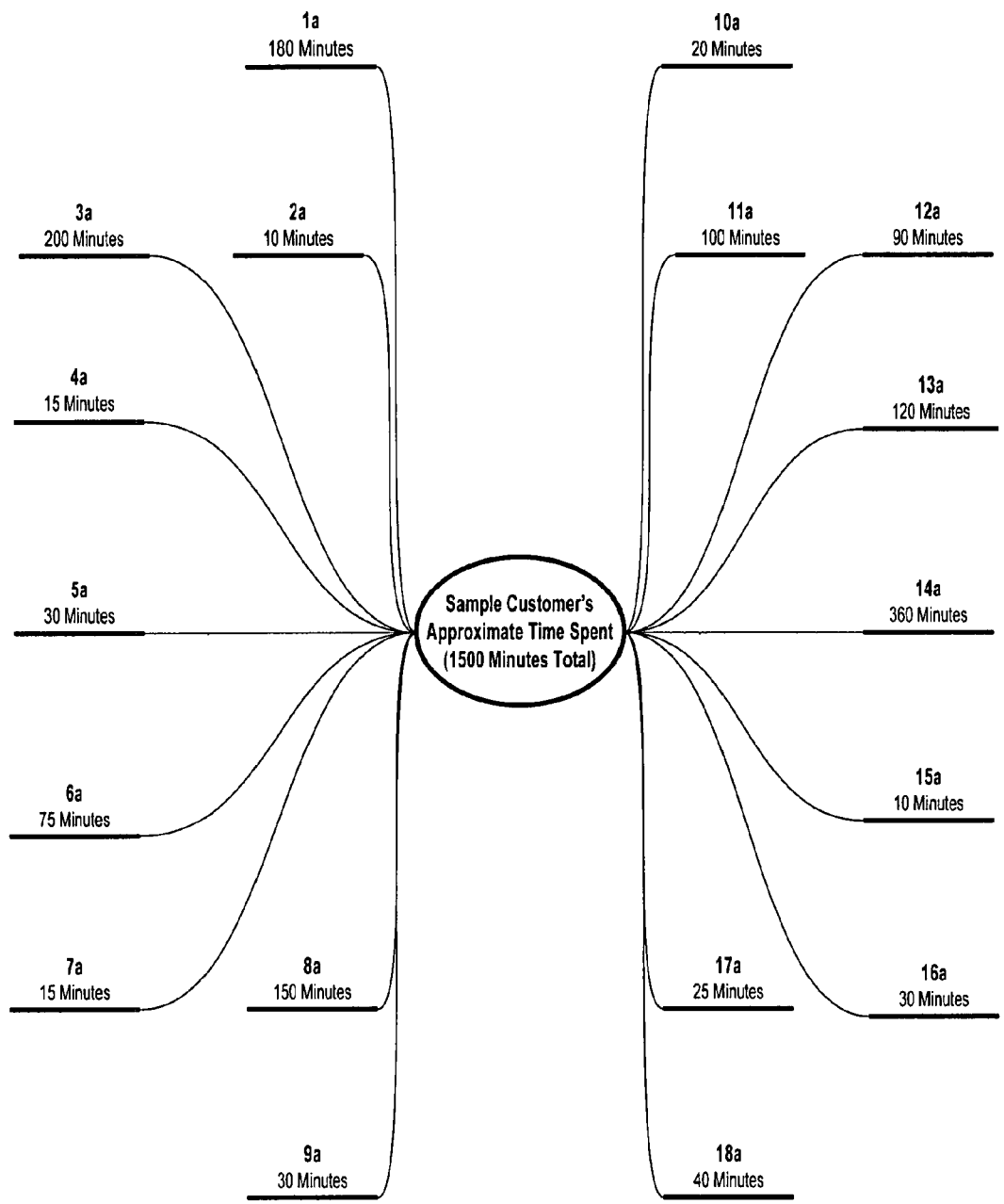
FIG. 9 is a chart illustrating an example of how a customer might spend time in a month accessing premium content within the premium content bundle.
Figure 10:
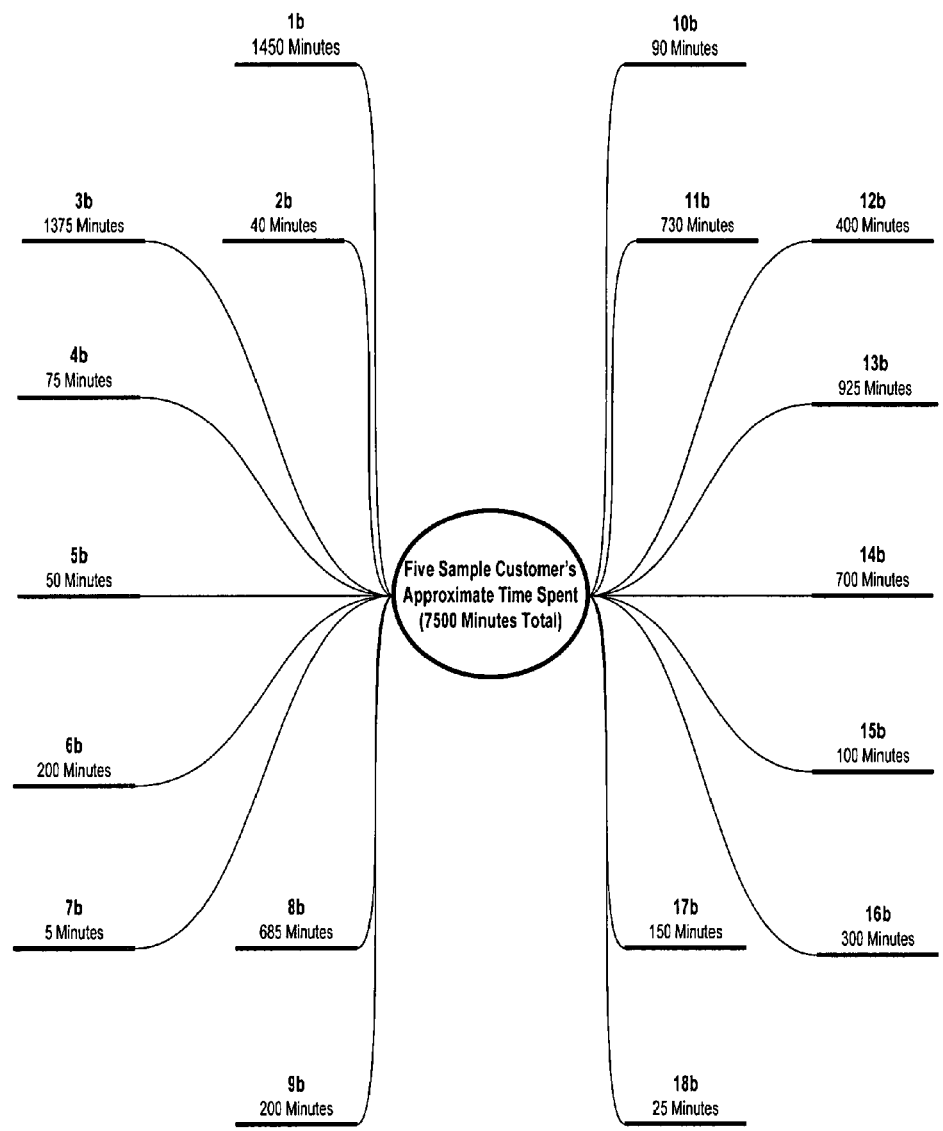
FIG. 10 is a chart illustrating an example of how multiple customers might spend time in a month accessing premium content within the premium content bundle.

Referring to FIG. 8 in conjunction with FIGS. 9 and 10, one method of determining the approximate time spent 60 is to use the following formula:

$$T = v*(e-s+m)$$

Where:

T is approximate time spent;

v is the valuation (discount or premium) given to a publisher's premium content;

s is the specific time the customer begins accessing premium content, e.g., 01:07:17 PM;

e is the specific time the customer stops (or ends) accessing premium content, e.g., 01:23:45 PM; and m is the modifications made to the approximate time spent based upon potential inaccuracies in measurement.

The valuation may be a premium, greater than 1, or a discount, less than 1. For example, a premium of 1.25 may be given to the approximate time spent by customers accessing the premium content of a particular partner to reward that partner for including exceptionally expensive premium content in the premium content bundle. Alternatively, a discount of 0.75 may be applied to the approximate time spent by customers accessing the premium content of a particular partner to discourage that partner from including premium content which may act to unfairly exploit the partner compensation formula described in the partner agreement.

Approximate time spent may be determined by employing various methods. One method is to determine approximate time spent for each customer as shown at 64. FIG. 9 illustrates an example of how a customer might spend their time according to terms of a premium content bundle which include a period of access of one month. Under each bundle partner's name, denoted 1a though 18a, appears a customer's approximate time spent for that specific partner's premium content during a period of access. The data collected during this stage is depicted in minutes. When approximate time spent data is determined on a for each customer basis, a set of separate approximate time spent metrics, as depicted in FIG. 9, are determined for each customer.

A possible method to determine approximate time spent is by tracking a new approximate time spent each time a customer accesses a separate partner's premium content as shown at 66 in FIG. 8. For example, this may be accomplished through the use of web beacons. Web beacons are images, usually 1×1 transparent gifs, which are placed on the premium content pages of the bundle partner's websites. When web beacons are downloaded by customers, the digital rights broker's web servers may determine the IP address downloading the premium content. When there is a specific cookie on the machine downloading the premium content, the time when the premium content is downloaded by the customer and other information may be tracked. This data may be used to determine approximate time spent for customers.

Alternatively, the digital rights broker may determine a customer's approximate time spent by using some form of presentation code. Presentation code functions in a manner similar to web beacons, except that data retrieval is triggered by code rather than by a customer downloading an image.

Another method for determining a customer's approximate time spent may involve using automatic counting software which is any type of software, e.g., a browser toolbar, installed on the customer's device, e.g., a computer, which automatically determines approximate time spent as the customer accesses premium content in the premium content bundle.

A method which may apply for premium content that is accessed while the customer is not connected to the internet, e.g., watching a movie or hearing a song on a compatible mobile device, involves the device determining approximate time spent through use of proprietary software and then sending that information to the digital rights broker's graphical user interface when it is reconnected to the internet. The proprietary software may be a type of automatic counting software. It is contemplated that a variety of different methods may be employed to determine approximate time spent data in accordance with the present disclosure.

Another way of determining approximate time spent is to use statistical analysis with data collected from a representative sample of the customer population as shown at 68. This method determines approximate time spent for a random sample of the customer population. When the sample is large enough, its behavior closely predicts that of the entire customer population. Also, a combination shown at 70 of statistical analysis shown at 68 could be used in combination with approximate time spent data for each customer shown at 66. For instance, data from statistical analysis shown at 68 may be used to find and modify erroneous approximate time spent data that is determined on a for each customer basis as shown at 66.

As an alternative to determining approximate time spent for each customer as in 64, the approximate time spent time spent may be calculated based on an approximate time spent for all customers shown at 72. FIG. 10 shows an example of approximate time spent for all customers accessing the premium content bundle during a specified period of access of one month. Approximate time spent for all customers may be determined by tracking the total approximate time spent by all customers accessing each partner's premium content, as shown at 74. When a customer accesses a particular partner's premium content, the approximate time spent by that customer is added to the determination of approximate time spent by all customers for that partner. Similarly, as described above, statistical analysis for customers from a sample of the customer population may be used to determine approximate time spent as shown at 76. Likewise, a combination of both of the previous methods may be used as shown at 78.

In another embodiment, the digital rights broker may determine other defined variables as shown at 80. For example, survey data may be determined by tracking customer responses to surveys or questions about the quality of premium content as shown at 82. Another example shown at 84 would be to implement a rating mechanism for the customer to rate premium content and then track the results to determine approximate time spent. Likewise, the number of unique visits, which is the number of times certain premium content is viewed by new customers, could be tracked as shown at 86. Also, the number of page-views which is the number of times certain premium content is viewed by customers may be determined as shown at 88.

A combination of the methods shown at 64, 72 and 80 may be implemented to more accurately determine approximate time spent, shown at 90. For example, the methods shown at 64 and 72, determining approximate time spent for each customer and approximate time spent for all customers respectively, may be initially employed. Then, the data from 64 may be used after it has been adjusted based on the data from 72.

For example, the data may show that customer number 2021 spent 40 hours watching a movie. The digital rights broker calculated, for instance, that the average customer spends 80 minutes watching this movie. The movie is 90 minutes long. The digital rights broker also calculated that customer 2021 watched movies in the past for approximately 5% more time than the average customer. In this example, the digital rights broker would modify the 40 hour approximate time spent to 80 minutes, 84 minutes or 90 minutes. In many cases, the digital rights broker would prefer to modify the 40 hours because that determination of approximate time spent is very unlikely to be accurate.

Numerous other adjustments may be made to approximate time spent so it more accurately reflects reality. For example, the method according to the present disclosure may include a time-out feature when a piece of premium content is accessed for an extended period of time, e.g., when a customer walks away from a computer. The time-out feature functions by setting an earlier stop time when determining the amount of time a customer actively spends accessing premium content. Thus, if a customer does not move a mouse for 2 minutes while playing an interactive game, the system may time-out the customer. This means that time would stop being added to the approximate time spent being determined rather than continuing to add time to this determination of approximate time spent. If determining approximate time spent for premium content, a time-out feature would allow for a more accurate determination of approximate time spent because time that a customer is not actively using premium content would not be added to approximate time spent. This time out feature may be included as a variable to the approximate time spent equation discussed above.

Additionally, when customers spend too much or too little time accessing premium content, their approximate time spent may be modified by averaging certain data. For example, the data may show that customer number 2022 spent 10 minutes accessing premium content within the premium content bundle during a certain period of access. The data also shows that customer number 2023 spent 43,000 minutes accessing premium content within the premium content bundle during the same period of access. The total approximate time spent by both customer 2022 and customer 2023 falls outside 3 standard deviations of the average for all customers during the same period of access. Therefore, for the purposes of compensating partners as described below, a new customer number 99998 is created. This new customer 99998, who has paid a fee equal to the sum of the fees paid by customers 2022 and 2023, and who has accessed premium content within the premium content bundle for 43,010 minutes as customers 2022 and 2023 have during this period of access. The data associated with customer 99998 is used in place of the data associated with customer's 2022 and 2023 while compensating partners as described below to improve the fairness of publisher compensation during this period of access. It is contemplated that a wide variety of methods of determining approximate time spent or other defined parameter data may be implemented in accordance with the present disclosure.

Referring back to FIG. 2, the partners are compensated based on approximate time spent at step 34. One way to compensate partners based upon approximate time spent data determined on a for each customer basis may involve an equation for publisher compensation as exemplified below.

There is information about customers, which may be represented in a data set as follows: $\{c_0, c_1, c_2 \ldots c_{n-1}, c_n\}$.

Where, for example, customer $c_9$ is John Smith, a resident of 123 Lake St. in Brooklyn, N.Y. who is associated with certain other personal, payment and authentication information.

Additionally, there is information about partners, which may be represented in a data set as follows: $\{p_0, p_1, p_2, \ldots p_{x-1}, p_x\}$.

Where, for example, partner $p_{12}$ is the Walt Disney Internet Group™, a publisher of premium content through multiple graphical user interfaces, including websites, such as ABC-NewsNow™, ESPN360™, Disney's Blast™, Disney Connection™, Disney's Toontown Online™, Playhouse Disney Preschool Time Online™, and Disney Game Downloads™.

Customers are charged fees for the rights to access premium content within the premium content bundle according to subscription terms may be represented in a data set as follows: $\{F(c_0), F(c_1), F(c_2) \ldots F(c_{n-1}), F(c_n)\}$.

Where, for example, a customer's fee $F(c_9)$ may equal $40/month. This means that John Smith pays the digital rights broker $40 monthly for access to premium content included in the premium content bundle.

Also, approximate time spent is determined for each customer during the period of access, as described above, and may be represented in a data matrix as follows:

$$\begin{Bmatrix} t(c_0, p_0), t(c_0, p_1), t(c_0, p_2) \ldots t(c_0, p_{x-1}), t(c_0, p_x) \ldots \\ t(c_1, p_0), t(c_1, p_1), t(c_1, p_2) \ldots t(c_1, p_{x-1}), t(c_1, p_x) \ldots \\ t(c_2, p_0), t(c_2, p_1), t(c_2, p_2) \ldots t(c_2, p_{x-1}), t(c_2, p_x) \ldots \\ t(c_{n-1}, p_0), t(c_{n-1}, p_1), t(c_{n-1}, p_2) \ldots t(c_{n-1}, p_{x-1}), t(c_{n-1}, p_x) \ldots \\ t(c_n, p_0), t(c_n, p_1), t(c_n, p_2) \ldots t(c_n, p_{x-1}), t(c_n, p_x) \ldots \end{Bmatrix}$$

Where, for example, the approximate time spent $t(c_9, p_{12})$ may equal 20 min. This means that the amount of time John Smith (customer 9) spent actively accessing premium content belonging to the Walt Disney Internet Group (partner 12) is approximately 20 minutes.

At the conclusion of the period of access, the amount owed by the digital rights broker to each partner on behalf of each customer is determined by using calculations as follows:

Amount $c_0$ owes to $p_0$ equals:

$$m(c_0, p_0) = F(c_0) \times \frac{t(c_0, p_0)}{\sum_{y=0}^{x} t(c_0, p_y)}$$

Amount $c_0$ owes to $p_1$ equals:

$$m(c_0, p_1) = F(c_0) \times \frac{t(c_0, p_1)}{\sum_{y=0}^{x} t(c_0, p_y)}$$

Amount $c_0$ owes to $p_2$ equals:

$$m(c_0, p_2) = F(c_0) \times \frac{t(c_0, p_2)}{\sum_{y=0}^{x} t(c_0, p_y)}$$

This continues until $p_x$.

Where, for example, the following calculation may be made:

$$m(c_9, p_{12}) = \$40 \times \frac{20 \text{ min}}{600 \text{ min}} = \$1.33$$

This means that the digital rights broker owes the Walt Disney Internet Group™ $1.33 on behalf of John Smith, because he spent 20 minutes accessing premium content to which the Walt Disney Internet Group™ had legal interest in and 10 hours of total time accessing premium content in the premium content bundle during this period of access.

Then, the total amount owed by the digital rights broker to each partner on behalf of all customers is determined by using calculations as follows:

Total owed to $p_0$ equals:

$$M(p_0) = \sum_{z=0}^{n} m(c_z, p_0)$$

Total owed to $p_1$ equals:

$$M(p_1) = \sum_{z=0}^{n} m(c_z, p_1)$$

Total owed to $p_2$ equals:

$$M(p_2) = \sum_{z=0}^{n} m(c_z, p_2)$$

This continues until $p_x$.

Where, for example, the amount $M(p_{12})$ may equal $100,000,000. This means that the total amount owed by the digital rights broker to the Walt Disney Internet Group™ on behalf of all customers is equal to $100,000,000 for this period of access.

The calculations above may be condensed into a general equation which may be used for partner compensation, as follows:

$$\sum_{z=0}^{n} F(c_z) = \sum_{y=0}^{x} M(p_y)$$

This equation states that the total amount of money collected from customers by the digital rights broker equals the total amount of money the digital rights broker owes partners on behalf of customers.

The general formula for partner compensation above may be expanded as follows:

$$\sum_{y=0}^{x} M(p_y) = \sum_{y=0}^{x} \sum_{z=0}^{n} m(c_z, p_y)$$

This equation states that the total amount of money owed by the digital rights broker on behalf of all customers to partners during the period of access equals the total amount of money owed by the digital rights broker to partners on behalf of each customer during the period of access.

The general formula for partner compensation above may also be further expanded to its full form as follows:

$$\sum_{y=0}^{x} \sum_{z=0}^{n} m(c_z, p_y) = \sum_{y=0}^{x} \sum_{z=0}^{n} F(c_z) \frac{t(c_z, p_y)}{\sum_{w=0}^{x} t(c_z, p_w)}$$

This equation states that the total amount of money owed by the digital rights broker to partners on behalf of each customer during the period of access is equal to the sum of each customer's fee for the period of access multiplied by that customer's approximate time spent accessing each partner's premium content over the total approximate time spent by that customer accessing all premium content in the premium content bundle during the period of access.

Figure 11:
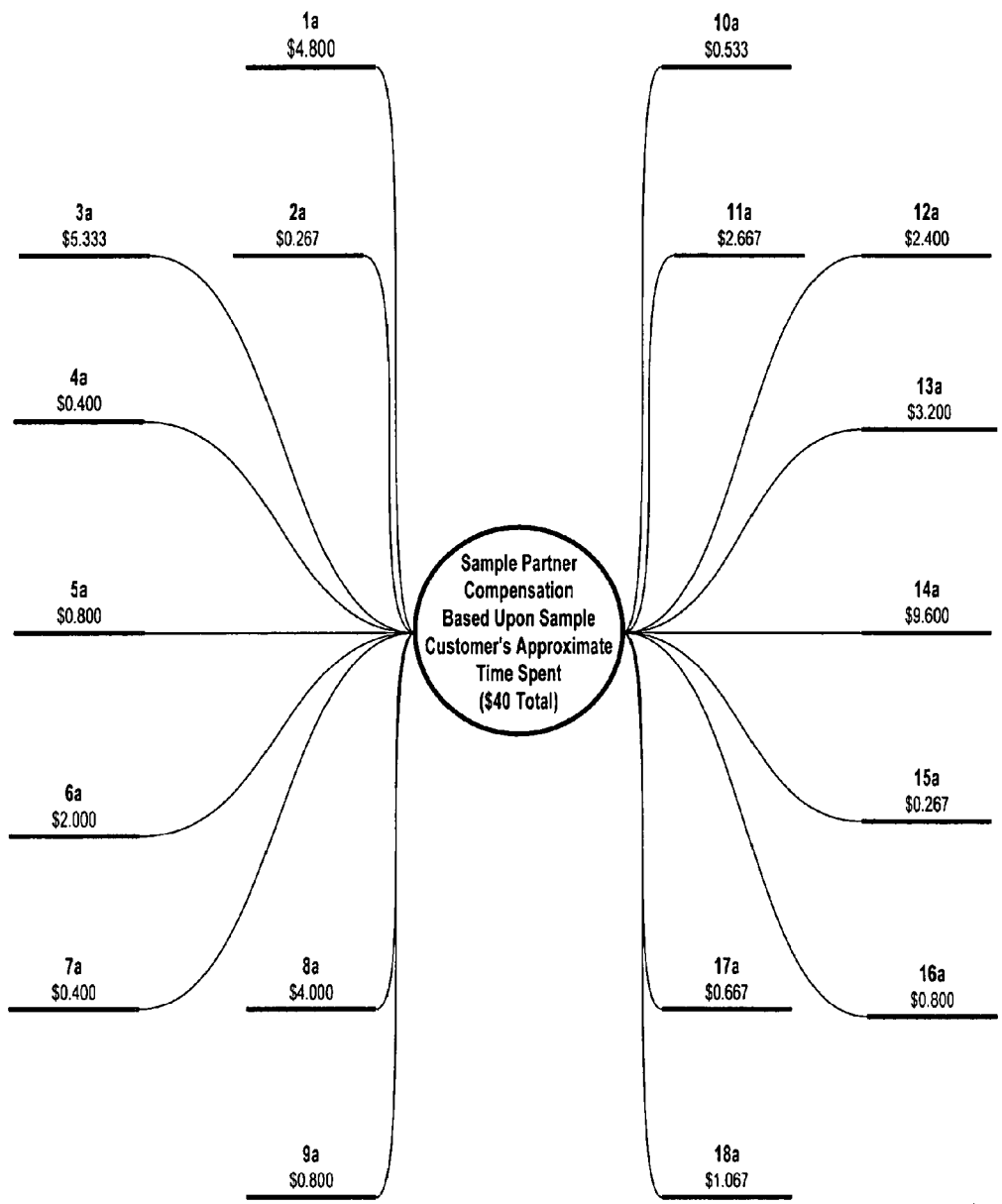
FIG. 11 is a chart illustrating an example of how money from a customer's fee for access may be dispersed to respective partners for a month of approximate time spent according to the general formula for publisher compensation without any modifications.

An example depicting payment to partners according to the general formula for partner compensation is shown in FIG. 11. FIG. 11 depicts the money owed to each partner, denoted 1a-18a, based on approximate time spent by one customer during a period of access of one month. This compensation is based on determinations of approximate time spent on a for each customer basis as shown in FIG. 9. This example is based on the general formula for partner compensation without any modifications. Additional examples of publisher compensation are shown below.

The following examples and figure descriptions show scenarios according to the current disclosure.

Example 1

A publisher (partner 2) has two customers: Customer 1, a loyal customer and Customer 2, an occasional customer. Both customers spend 25 hours per period of access using premium content in a premium content bundle for which the customers pay $50 per month. The loyal customer enjoys one particular song, listening to it over-and-over again 20 times. The occasional customer listens to the song just once. The song is 3 minutes long.

The partner receives $2.00 from Customer 1 for this song this month:

$$m(c_1, p_2) = F(c_1) \frac{t(c_1, p_2)}{\sum_{y=0}^{x} t(c_1, p_y)} = \$50 \times \frac{60 \text{ min}}{1500 \text{ min}} = \$2.00$$

The partner receives 10 cents from Customer 2 for this song this month:

$$m(c_2, p_2) = F(c_1) \frac{t(c_2, p_2)}{\sum_{y=0}^{x} t(c_2, p_y)} = \$50 \times \frac{3 \text{ min}}{1500 \text{ min}} = \$0.10$$

Example 2

There are two partners in this example, partner 1, a movie publisher, and partner 2, a music publisher. Partner 1 has recently released a very popular movie for customers to access in the premium content bundle. Therefore, customers have recently watched partner 1's movies for more time than they have listened to partner 2's music.

Partner 1's compensation =

$$M(p_1) = \sum_{z=0}^{n} m(c_z, p_1) = \sum_{z=0}^{n} F(c_z) \frac{t(c_z, p_1)}{\sum_{w=0}^{x} t(c_z, p_w)}$$

Partner 2's compensation =

$$M(p_2) = \sum_{z=0}^{n} m(c_z, p_2) = \sum_{z=0}^{n} F(c_z) \frac{t(c_z, p_2)}{\sum_{w=0}^{x} t(c_z, p_w)}$$

In this example $t(c_z, p_1)$ increases substantially, leading to a slight increase in $$\sum_{w=0}^{x} t(c_z, p_w).$$

Therefore, partner 1's compensation increases substantially, while partner 2's compensation decreases. If partner 2 included better premium content within the premium content bundle, the opposite effect would occur. This example illustrates economic implications of the inventive methods and systems according to the present disclosure.

It is envisioned that the equation for publisher compensation may require many modifications. For example, one type of modification involves allowing the digital rights broker to collect a service fee for services. This modification may be performed through an operation such as paying the digital rights broker a percentage (k) from the total paid out, as exemplified in the following equation:

$$\sum_{z=0}^{n} F(c_z) = (1-k) \times \sum_{y=0}^{x} M(p_y) + k \times \sum_{y=0}^{x} M(p_y)$$

$$= \sum_{y=0}^{x} \sum_{z=0}^{n} (1-k) \times F(c_z) \frac{t(c_z, p_y)}{\sum_{w=0}^{x} t(c_z, p_w)} +$$

$$\sum_{y=0}^{x} k \times F(c_z)$$

Where:

$$\sum_{y=0}^{x} \sum_{z=0}^{n} (1-k) \times F(c_z) \frac{t(c_z, p_y)}{\sum_{w=0}^{x} t(c_z, p_w)} = \text{the amount all partners receive;}$$

and $$\sum_{y=0}^{x} k \times F(c_z) = \text{the amount the digital rights broker receives.}$$

Many other types of modifications may be made to the general formula for partner compensation. Other modifications may include, but are not limited to, allowing customers to access premium content on devices which disconnect from and later reconnect to the internet, compensating partners who include certain pieces, types or categories of premium content relatively more or less than other partners for the same amount of approximate time spent by customers, applying a minimum or maximum to the amount of compensation each partner may receive, allowing customers to access premium content from more than one partner at the same time, and appropriating funds for a customer promotion.

It is contemplated that several variations to the general formula for partner compensation may be made. For instance, alternative defined parameter data may be used instead of, or in addition to, approximate time spent. Examples of defined parameter data other than approximate time spent may include, but are not limited to, unique visits, page views, survey data and variables determined from a customer rating mechanism. These formulas for partner compensation may also be modified in a variety of ways. These variables, or techniques, may be used in place of the approximate time spent metric in formulas for partner compensation as they may generate results correlated to those generated by compensating partners based upon approximate time spent.

Figure 12:
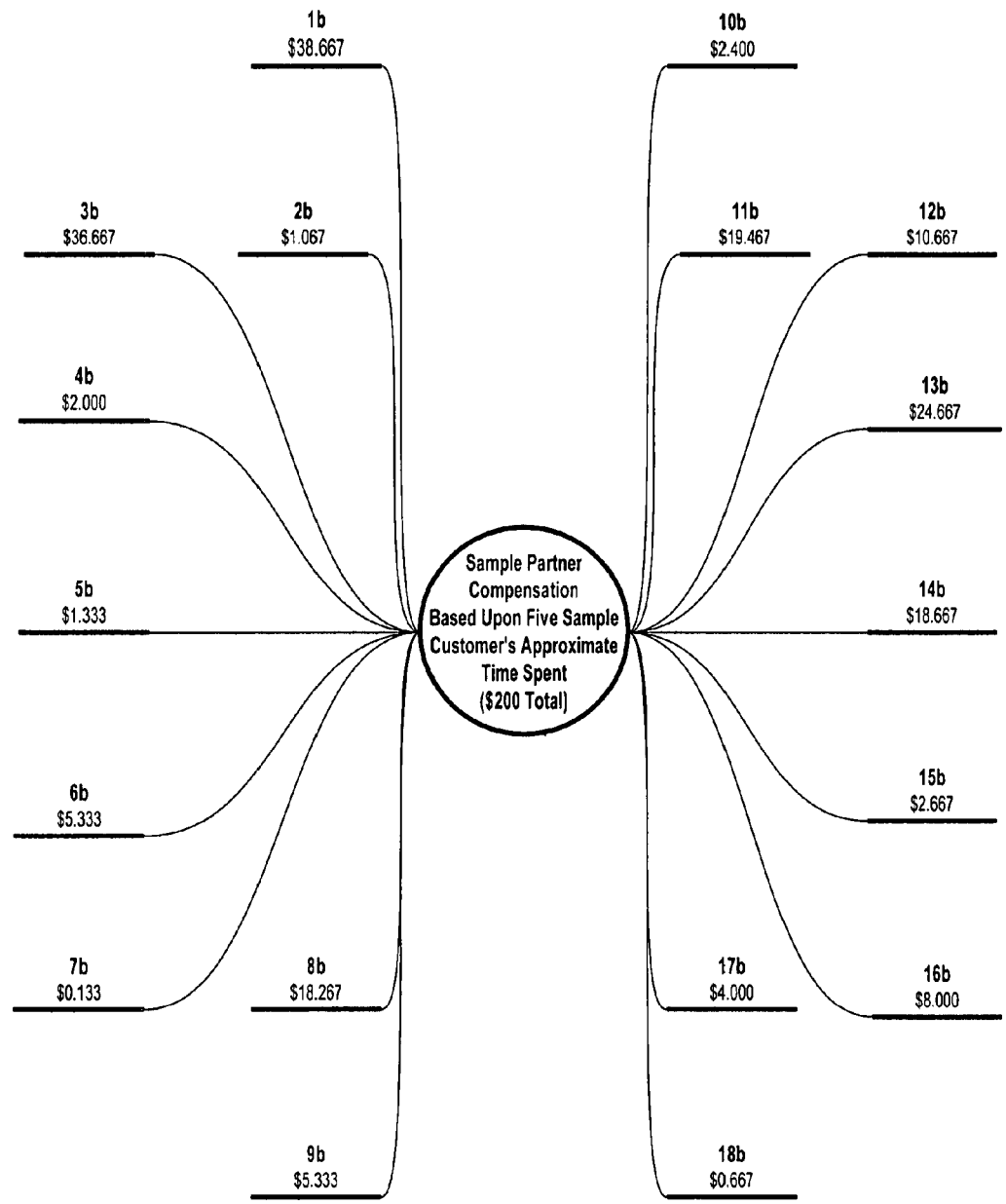
FIG. 12 is a chart illustrating an example of how money from multiple customers' fees for access may be dispersed to respective partners for a month of approximate time spent.

Generally, partners are compensated based upon the amount of approximate time spent determined on a for each customer basis. Alternatively, the partner compensation formula may be modified to calculate partner compensation based upon the approximate time spent for all customers. FIG. 12 is a chart illustrating an example of how money from multiple customers' fees for access may be dispersed to respective partners, namely 1b-18b, for a period of access of one month. This compensation is based on the approximate time spent as shown in FIG. 10. Furthermore, the formula for partner compensation may compensate partners based upon other defined parameter data collected for all customers rather than for each customer.

As an alternative to compensating partners based upon defined parameter data collected during the period of access of the customer's use, the payment may be determined by using previously obtained defined parameter data such as approximate time spent. For example, the partner agreement may include terms for the amount each partner will be paid, e.g., either a percentage of all fees collected or a fixed amount. These compensation amounts may typically be based upon historical determinations of approximate time spent data or other defined parameter data which is determined in a similar manner to the previously described methods. For example, an agreement may state that a partner will allow customers the right to access their premium content in exchange for 15% of revenues collected from customers by the digital rights broker based upon determinations of approximate time spent accessing premium content by these or other customers in the past. The determinations of approximate time spent may have been made by a person, persons, entity or entities other than the digital rights broker.

As discussed above, as the variety of premium content in the premium content bundle increases, the value of the premium content bundle itself, and the quality of the premium content increases as well. Accordingly, it may be desirable for the method according to the present disclosure to create a competitive environment among partners. Competition immediately increases the value of the premium content bundle for customers because it encourages partners to create better premium content so they can give customers a larger incentive to spend more time accessing their premium content and, thereby, the partners earn more money.

Approximate time spent may be used to deliver ranked search results in order of relevancy to an internet user. For example, just as approximate time spent was employed in the publisher compensation equation to compensate partners as previously discussed, approximate time spent may be used to deliver more relevant search results to interne users. This search algorithm can be used either in combination with or independently from the methods for providing access to premium content included in a premium content bundle to customers.

In alternative embodiments, the inventive method and service according to the present disclosure may be applied to premium content which is intangible, but distributed in a live setting rather than digitally. For example, a digital rights broker may own a property with four rooms. This digital rights broker may allow partners, e.g., a comedian, an educational lecturer, a musical group and an artist, to each rent one of four rooms on his property by entering into a partner agreement. This digital rights broker may thereafter charge customers a flat fee to access the entire property for a fixed period of access. One of the terms of the customer agreement may be to distribute a small global positioning system device to each customer, e.g., on a wristband. The digital rights broker then determines the approximate time spent by each customer in each partner's room according to the approximate time spent data collected by the global positioning system. The digital rights broker may then compensate the partners according to the partner agreement based upon this data.

As discussed above, it is important for partners to value their premium content. According to the valuation equation previously discussed, partners may manipulate the value of their premium content by altering either the total time it takes to use their premium content (t) or the premium content's utility (u) for each customer.

A basic example of the analysis partners may use follows:
Case 1: Increasing u vs. Decreasing t for a busy person

|  | Current Value | Increase u | Increase t |
| --- | --- | --- | --- |
| Time Constraint (alpha) | 2 | 2 | 2 |
| Utility (u) | 16 | 64 | 16 |
| Time (t) - in hours | 4 | 4 | 2 |
| Premium Content Value (V) | 1 | 4 | 4 |

In this case, the partner has a movie with a value of 1 to the customer. The partner knows that the customer has a relatively large time constraint e.g., is a busy person with an alpha of 2. The partner can infer that making the premium content four times as good or useful, e.g., increasing utility from 16 to 64, is as effective as making the movie twice as short, e.g., from 4 hours long to 2 hours long.

Case 2: Increasing u vs. Decreasing t for a non-busy person

|  | Current Value | Increase u | Increase t |
| --- | --- | --- | --- |
| Time Constraint (alpha) | 0.5 | 0.5 | 0.5 |
| Utility (u) | 4 | 8 | 4 |
| Time (t) - in hours | 16 | 16 | 4 |
| Premium Content Value (V) | 1 | 2 | 2 |

In this case, the partner has an eBook with a value of 1 to the customer. The partner knows that his customer has a relatively smaller time constraint, e.g., has a lot of time with an alpha of ½. The partner can infer that making the premium content twice as good or useful, e.g., increasing utility from 4 to 8, is as effective as reducing the number of pages in the eBook by 75%, e.g., from 16 hours worth of reading to 4 hours worth of reading.

According to the general formula for partner compensation, the movie publisher in Case 1 does not earn as much money as the eBook publisher in Case 2. Since customers value a 4 hour movie as much as customers value a 16 hour eBook, customers are indifferent between both options. Therefore, the eBook partner will earn 4 times as much as the movie partner according the current values. These techniques add another dimension to the partner's decision of what type of premium content to include in the premium content bundle.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for dispersing payment to a supplier of premium content, the method comprising the steps of:
providing at least one customer with access to premium content from a supplier, wherein the at least one customer accesses the premium content via an internet connection from a device that is capable of connecting to the internet;

using a server to monitor when the at least one customer accesses the premium content;

subsequent to the at least one customer accessing the premium content, collecting on a server defined parameter data of the at least one customer's interaction within the premium content over one or more periods of time, wherein the defined parameter data comprises approximate time spent interacting within the premium content;

calculating a payment for the supplier based on the collected defined parameter data; and dispersing the payment to the supplier.

2. The method of claim 1, wherein the at least one customer is a plurality of customers and the dispersed payment is determined from the approximate time spent by each of the plurality of customers.

3. The method of claim 1, wherein the at least one is a plurality of customers and the dispersed payment is determined from the approximate time spent by all customers.

4. The method of claim 1, wherein the step of collecting approximate time spent data includes using web beacons.

5. The method of claim 1, wherein the step of collecting approximate time spent data includes using automatic counting software.

6. The method of claim 1, wherein the step of collecting approximate time spent data includes using statistical sampling.

7. The method of claim 1, wherein the defined parameter data further comprises unique visits.

8. The method of claim 1, wherein the defined parameter data further comprises survey data.

9. The method of claim 1, wherein the defined parameter data further comprises variables determined from a customer rating mechanism.

10. The method of claim 1, further comprising downloading the premium content onto the device.

11. The method of claim 1, wherein the premium content comprises a plurality of items.

12. The method of claim 1, wherein the premium content comprises a single item.

13. The method of claim 1, wherein prior to the providing step, the at least one customer enters into an agreement.

14. The method of claim 13, wherein the agreement provides access to a single item of premium content for a single fee.

15. The method of claim 1, wherein the premium content is at least one item selected from the group consisting of: articles, eBooks, sound files, music, interactive applications, software, games, video files, movies, and a combination thereof.

16. The method of claim 1, wherein the device that is capable of connecting to the internet is selected from the group consisting of: a television, a portable music player, a portable media player, a portable communications device, a video game console, and a computer.

17. The method of claim 1, wherein the at least one customer accesses the premium content from the device that is capable of connecting to the internet via a graphical user interface (GUI).

18. The method of claim 17, wherein the GUI is selected from the group consisting of: a website, a browser toolbar, a standalone web browser, and a standalone software application.

19. The method of claim 17, wherein the GUI is configured to require authentication information prior to providing access to the premium content.

20. The method of claim 19, wherein the authentication information is selected from the group consisting of: a user name, a password, and a combination thereof.

* * * * *